US012711392B1

(12) United States Patent
Kang et al.

(10) Patent No.: US 12,711,392 B1
(45) Date of Patent: Aug. 18, 2026

(54) FINE-TUNED ARTIFICIAL INTELLIGENCE MODEL WITH EVENT MAPPING FEATURES

(71) Applicant: Intuit Inc., Mountain View, CA (US)

(72) Inventors: Byungkyu Kang, San Diego, CA (US); Farzaneh Khoshnevisan, San Diego, CA (US); Ramakrishnan Sathyavageeswaran, Mountain View, CA (US); Swapnil Parekh, Mountain View, CA (US); Andrew Thomas Mattarella-Micke, Palo Alto, CA (US); Maya Vered Livshits, Campbell, CA (US); Katharine Vanessa Wurtzell, San Diego, CA (US); Royston Soares, San Francisco, CA (US); Sonia Sharma, Fremont, CA (US); Nicholas Kevin Anthony Yee, Toronto (CA); Samir Patel, Calgary (CA); Yvonne Yi Wen Ng, Toronto (CA); Joseph Liu, San Diego, CA (US); Shivakumara Narayanaswamy, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/287,703

(22) Filed: Jul. 31, 2025

(51) Int. Cl.
*G06N 3/092* (2023.01)
*G06F 16/35* (2019.01)
*G06N 3/0475* (2023.01)

(52) U.S. Cl.
CPC ............. *G06N 3/092* (2023.01); *G06F 16/35* (2019.01); *G06N 3/0475* (2023.01)

(58) Field of Classification Search
CPC ....... G06N 3/092; G06N 3/0475; G06F 16/35
See application file for complete search history.

(56) References Cited

U.S. PATENT DOCUMENTS

| | | | | |
|---|---|---|---|---|
| 2012/0245944 | A1* | 9/2012 | Gruber | G06N 5/041 704/270.1 |
| 2022/0021636 | A1* | 1/2022 | Wayne | H04L 51/02 |
| 2024/0143633 | A1* | 5/2024 | Chen | G06F 16/313 |
| 2024/0256965 | A1* | 8/2024 | Chung | G06N 20/00 |
| 2024/0395246 | A1* | 11/2024 | Mcquinn | G06N 3/084 |

OTHER PUBLICATIONS

Zezhong Wang, et al., The Chinese University of Hong Kong, Huawei Noah's Ark Lab, ToolFlow: Boosting LLM Tool-Calling Through Natural and Coherent Dialogue Synthesis, Abstract, Mar. 17, 2025, 18 pages.

* cited by examiner

*Primary Examiner* — Brent Johnston Hoover
(74) *Attorney, Agent, or Firm* — Dinsmore & Shohl LLP

(57) ABSTRACT

Certain aspects of the disclosure provide a method for fine-tuning a language model (LM) including obtaining a first conversation stream of a first conversation, wherein the first conversation stream includes one or more messages and one or more events; mapping an event to at least one message of the one or more messages, the mapping being performed using at least one of event-based labeling or content-based labeling; and fine tuning a language model (LM) using the event and the at least one message that are mapped, the fined-tuned LM being configured for: determining one or more tools that are external to the fine-tuned LM and invokable, by the fine-tuned LM, at least to generate an output that is related to the event and the at least one message, the output being usable by the fine-tuned LM during a second conversation to perform one or more actions.

13 Claims, 9 Drawing Sheets

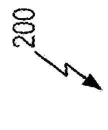
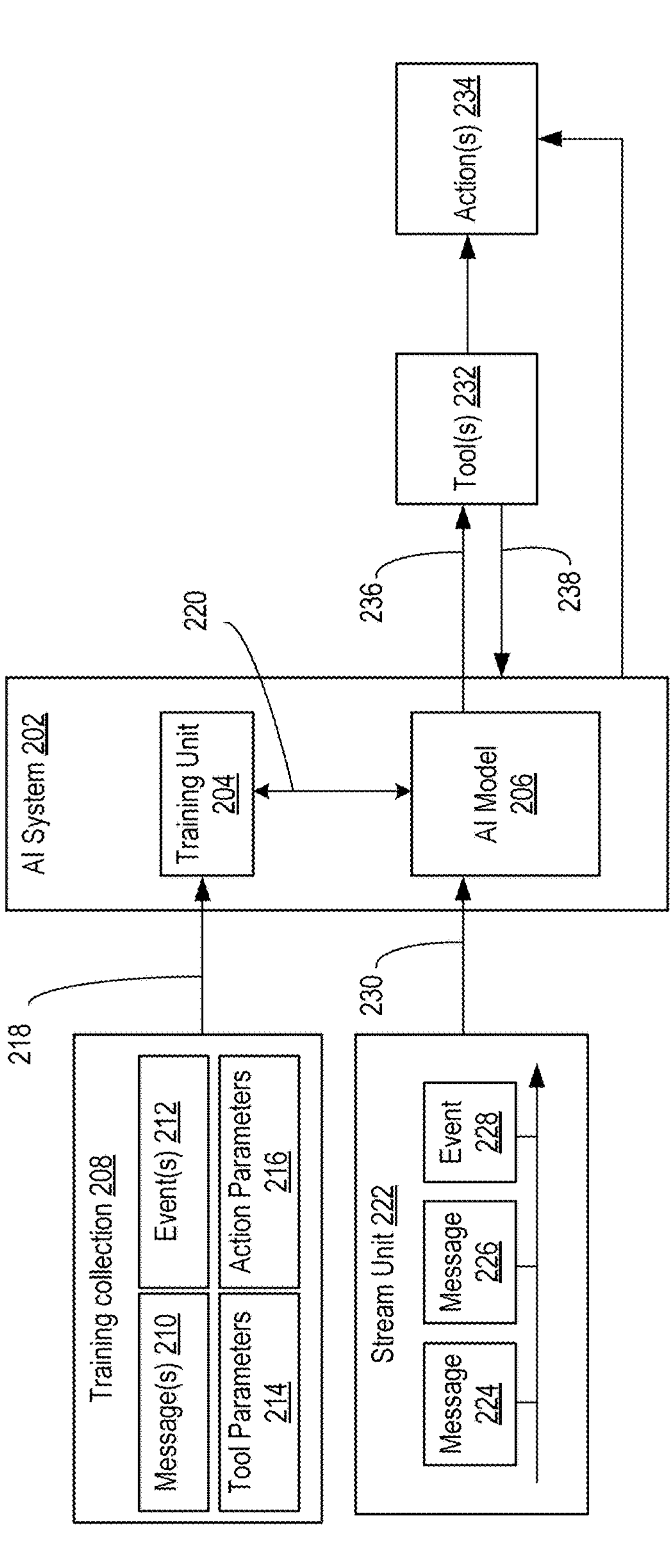
FIG. 2

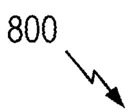

A method for determining one or more tools performing one or more actions

Receive a conversation stream of a conversation, wherein the conversation stream includes one or more messages and one or more events — 805

Determine, using a fine-tuned LM, one or more tools that are external to the fine-tuned LM and invokable, by the fine-tuned LM, at least to generate an output that is related to an event and at least one message that is mapped by the fine-tuned LM to the event, the output being usable by the fine-tuned LM during the conversation to cause one or more actions to be performed, the fine-tuned LM being pretrained using at least one of event-based labeling or content-based labeling — 810

Cause one or more actions to be performed based on the output generated by the one or more tools — 815

*FIG. 8*

FINE-TUNED ARTIFICIAL INTELLIGENCE MODEL WITH EVENT MAPPING FEATURES

BACKGROUND

Field

Aspects of the present disclosure relate to artificial intelligence (AI) models fine-tuned on event mapping features.

Description of Related Art

Expert augmentation systems have become prevalent components of modern digital platforms. These systems leverage the use of AI models that are trained to augment the services provided by an expert (e.g., a human expert). In many cases, these systems are designed to provide experts engaged in an interaction with a user with content that may be relevant to the interaction and which may assist the user to some useful end. For example, an expert augmentation system may leverage AI models to suggest answers to user questions that are related to specific products and services offered by an organization for whom the expert works. The suggested answers may be generated by the AI models in natural language format and may provide the expert with content to assist the user. Given their widespread application across diverse technological domains, expert augmentation systems represent an important component in providing expert service to users.

SUMMARY

One aspect provides a method that includes obtaining a first conversation stream of a first conversation, wherein the first conversation stream includes one or more messages and one or more events; mapping an event of the one or more events to at least one message of the one or more messages, the mapping being performed using at least one of event-based labeling or content-based labeling; and fine tuning a language model (LM) using the event and the at least one message that are mapped, the fined-tuned LM being configured for: determining one or more tools that are external to the fine-tuned LM and invokable, by the fine-tuned LM, at least to generate an output that is related to the event and the at least one message, the output being usable by the fine-tuned LM during a second conversation to perform one or more actions.

Another aspect provides a method that includes receiving a conversation stream of a conversation, wherein the conversation stream includes one or more messages and one or more events; determining, using a fine-tuned LM, one or more tools that are external to the fine-tuned LM and invokable, by the fine-tuned LM, at least to generate an output that is related to an event and at least one message that is mapped by the fine-tuned LM to the event, the output being usable by the fine-tuned LM during the conversation to cause one or more actions to be performed, the fine-tuned LM being pretrained using at least one of event-based labeling or content-based labeling; and causing one or more actions to be performed based on the output generated by the one or more tools.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

FIG. 2 depicts an example system configured for determining tools and actions.

FIG. 8 depicts a schematic flow chart diagram of an example method for determining tools and performing actions.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
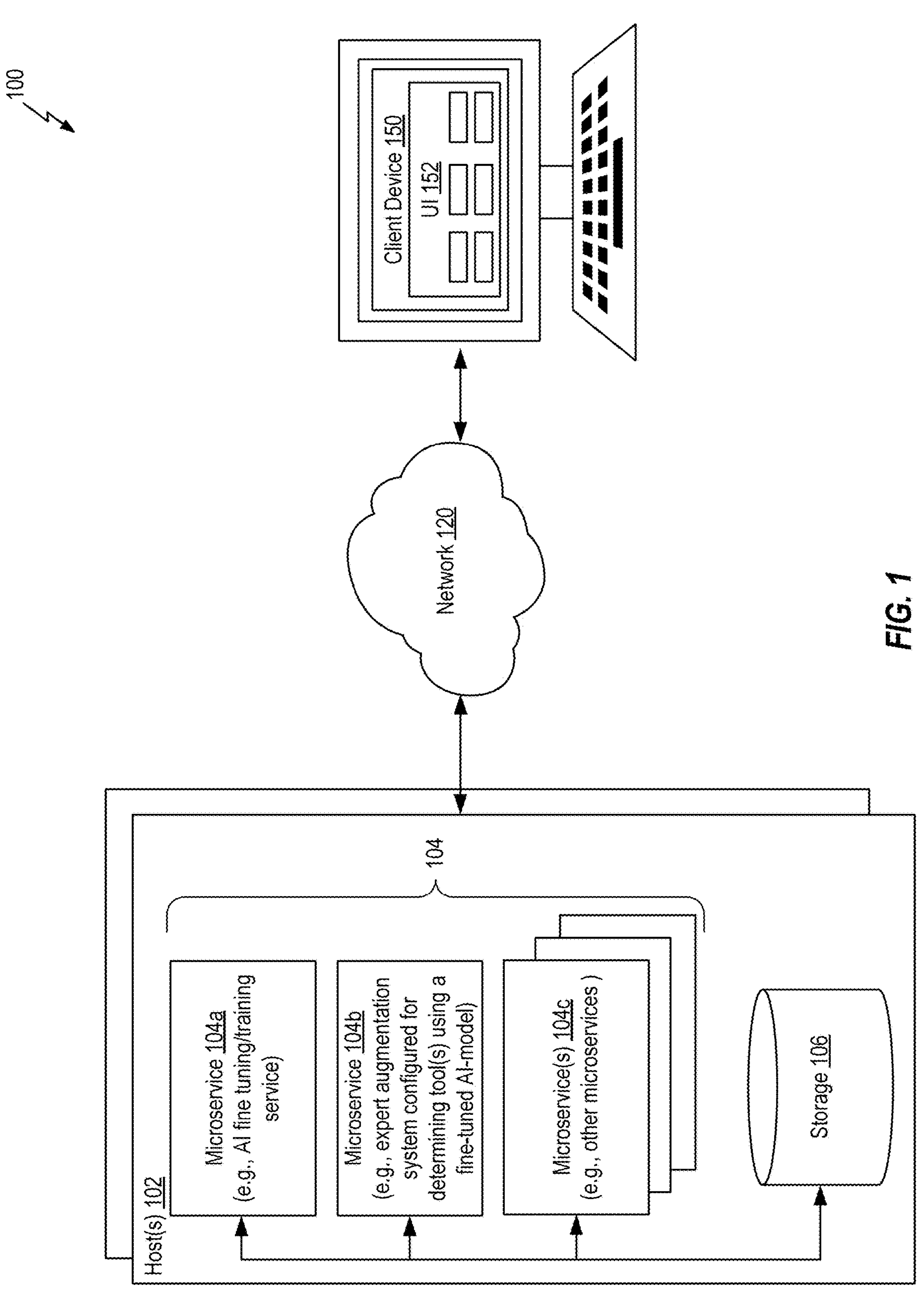
FIG. 1 is a schematic system diagram illustrating an example processing system supporting microservices interconnected via a network.

Aspects of the present disclosure provide apparatuses, methods, processing systems, and computer-readable mediums for utilizing AI models fine-tuned on event mapping features.

As described above, conventional expert augmentation systems leverage the use of AI models that are trained to augment the services that are provided to a user by an expert during an interaction. Typical services provided by the expert during an interaction with the user include exchanging messages with the user to provide account information, product information, product advice, technical support, etc. More specifically, the interaction can be augmented by enriching the interaction with actions that are caused or performed by an AI model of the expert augmentation system, which may be relevant to the interaction and in addition to the messages that the expert exchanges with the user. For example, a user of an expert augmentation system may transmit a message to the expert, where the user states that his bank account balance has been unusually low for the past thirty days and requests the current bank account balance. The expert retrieves the current bank account balance and transmits it in a message for the user to review. The interaction between the user and the expert may be augmented by the AI model of the expert augmentation system by causing another message to be transmitted to the user, where the message includes a report that includes the daily account balance for the past thirty days and daily transactions for the user to review. In other words, the interaction is augmented by performing an action (e.g., providing the report), in addition to the messages that the expert exchanges with the user.

An example of an AI model used by expert augmentation systems is a language model (LM). An LM is generally a type of machine learning model that is designed to understand, generate, and manipulate human language. LMs are useful in natural language processing (NLP) and computational linguistics for performing a range of certain actions involving human language. LMs have a wide array of applications, including: text generation (e.g., producing coherent and contextually appropriate text; machine translation (e.g., converting text from one language to another); speech recognition (e.g., converting spoken language into text); text summarization (e.g., condensing a long piece of text into a shorter summary); sentiment analysis (e.g., determining the sentiment expressed in a piece of text); and question answering (e.g., automatically providing answers to questions posed in natural language).

For example, an LM of an expert augmentation system is configured to understand a question contained in a message transmitted by a user during an interaction, determine that an action needs to be performed, and perform the action or cause the action to be performed. More specifically, the user asks why a bank account balance has been unusually low for the past thirty days. To answer the question, the LM determines that a report needs to be generated. The LM automatically generates and transmits a message to the user including the report. The report includes text that is related to account information and that is generated and summarized by the LM.

However, the actions that an LM can perform may be limited in some cases. To address these limitations, an LM of conventional expert augmentation system may cause one or more actions to be performed by invoking a tool that is specifically configured to perform the action(s) and/or generate one or more outputs that trigger the action(s) to be performed by one or more components of the expert augmentation system. Examples of tools include a software application, hardware, an application programming interface (API), an agent, etc. In the present disclosure, the term "invoke" and the term "call" may be used interchangeably. To invoke (e.g., to call) a tool, the LM generates parameters that are specific to the tool and that cause the tool to perform the action(s) or generate output(s) based on the transmitted parameters. For example, based on the contents of messages, the LM generates and transmits parameters that are specific to a tool that is configured for report generation. The transmitted parameters cause the tool to generate the report and transmit a message including the report.

Further, LMs of conventional expert augmentation systems invoke tools only after a user's interaction with an expert ends, or periodically during the interaction. As an example, when an expert receives messages from a user, the expert augmentation system inspects all the messages, and when the interaction has concluded, invokes a tool which generates a report that summarizes all the messages. As another example, a conventional expert augmentation system is configured to periodically invoke a tool to update a user with current stock market information. More specifically, the expert augmentation system receives messages within a fixed time interval (e.g., 5 minutes) and inspects the contents of all the messages to find stock symbols. After the fixed time interval has elapsed, the tool is invoked to retrieve current stock prices for the stock symbols found during the fixed time interval, and the current stock prices are provided in a message to the user. The process of periodic tool invocation is repeated for every fixed time interval to provide updated stock prices, until the interaction is terminated.

However, conventional expert augmentation systems suffer from several technical problems. For example, because periodically invoking a tool may require processing all the messages that are received within the fixed time intervals and the fixed time intervals are typically relatively long (e.g., ten minutes), these systems process a large quantity of messages before invoking the tool (which as a result may take a long time to perform an action). As another example, invoking a tool after the interaction has concluded may require processing an even larger quantity of messages before a tool can be invoked. Similarly, large quantities of messages are processed by the conventional expert augmentation systems when the LM of these systems is trained for invoking tools. Further, in order to process the large quantities of messages that are associated with typical tool invocation and system training, conventional expert augmentation systems consume excessive resources, including compute, memory, and/or network bandwidth.

In addition, because the fixed time intervals are typically long, the messages processed by conventional expert augmentation systems may include content that is outdated by the time the tool is invoked. Thus, actions performed by the tool may be based on outdated content. For example, a report generated by a tool may include information that is no longer current. This may cause the user to transmit additional messages requesting that the report be updated with fresh content, thereby causing additional processing of messages, tool invocations, and additional consumption of resources.

Other technical problems associated with conventional expert augmentation systems include the inability to rapidly respond to messages during the interaction. For example, because expert augmentation systems need to wait for either a fixed time interval to elapse or the interaction to be terminated before invoking a tool, these systems are unable to quickly react to each message that requires an immediate response. This may cause additional messages to be transmitted by the user in order to emphasize the immediate nature of the message, which further increases the processing of messages, tool invocations, and additional consumption of resources. These inefficiencies can lead to system bottlenecks, increased operational costs, and overall degraded user experience.

These technical problems create a compelling need for improved expert augmentation systems that can provide timely augmentation during an interaction between a user and an expert. Accordingly, the present disclosure provides an expert augmentation system and corresponding methods that improve upon the state-of-the-art and provide technical solutions to the aforementioned technical problems associated with existing expert augmentation systems. In particular, an expert augmentation system that maps an event to one or more messages is disclosed. The expert augmentation system includes an LM that is fine-tuned using the event and the associated message(s) that are mapped to the event. Further, the fine-tuned LM is used by the expert augmentation system to determine one or more tools that the fine-tuned LM can invoke to perform one or more actions and/or cause one or more actions to be performed.

In some aspects, the event is related to the user and/or expert (e.g., as a mouse click, executing a query, performing a search, etc.). Further, an event may be also related to a specific tool (e.g., a mouse click by a user on a report generation link is closely related to a tool configured for report generation). In certain aspects, one or more messages (and/or events) occur within a time delta that satisfies a threshold (e.g., a time interval, such as one minute (or less), i.e., shorter than time intervals associated with conventional tool invocation). The time delta may be defined as a time interval between messages that are mapped to the event, between one or more messages and the event, or between events. Further, the threshold may be set such that messages with a time delta that satisfies the threshold do not include content that is outdated.

Aspects of the present disclosure provide many technical improvements to the state of the art. By mapping an event to one or more messages, messages that are related to the event are processed by the expert augmentation system in order to fine tune the LM. In other words, the expert augmentation system is able to selectively focus on messages (e.g., a reduced quantity of messages) that are related to the event and/or a tool, while ignoring messages that are not. Further, by mapping an event to one or more messages that have a time delta that satisfies a threshold, the expert augmentation system is able to selectively focus on one or more messages that are within a reduced, and more temporally relevant time interval, while ignoring the messages that are not in the interval (and/or that include outdated content). That is, the messages that are not related to the event or not within the time delta do not need to be processed by the expert augmentation system in order to fine tune the LM. In addition, the fine-tuned LM may be deployed to invoke tools in accordance with the mapping used during fine-tuning, thereby allowing the fine-tuned LM that is deployed to avoid processing messages that are not in accordance with the mapping. Thus, the expert augmentation system described herein is fine-tuned to invoke and invokes tools by processing a reduced quantity of messages, thereby improving resource utilization, including utilization of compute, memory, and/or network bandwidth used to process the messages.

Other technical improvements provided by the expert augmentation system described herein include being able to rapidly respond to messages during the interaction. More specifically, the expert augmentation system can invoke tool(s) immediately after the expert augmentation system receives at least an event, i.e., without having to wait for a fixed interval of time to elapse before the tool is invoked, thereby avoiding processing of additional messages, additional tool invocations, and the resulting additional consumption of resources.

While this disclosure refers to certain example practical applications for expert augmentation systems, the expert augmentation systems and corresponding methods described herein may be used in a wide variety of use cases.

Example Microservices Architecture where Services Implement Aspects of an Expert Augmentation System FIG. 1 depicts an example system 100 supporting a plurality of microservices 104 (e.g., software-defined services, which in some cases, may be cloud-native). As shown in FIG. 1, system 100 includes one or more client devices 150 (collectively referred to herein as "client devices 150") and one or more hosts 102 (collectively referred to herein as "hosts 102"). A network 120 may provide connectivity between client device 150 and host 102. Network 120 may include, for example, a direct link, a local area network (LAN), a wide area network (WAN) (such as the Internet), another type of network, or a combination of one or more of these networks.

Host 102 may be geographically co-located servers on the same rack or on different racks in any arbitrary location in a data center. Host 102 may be implemented on a server-grade hardware platform. Host 102 or the hardware platform may include components of a computing device, such as one or more processors (e.g., central processing units (CPUs)), one or more memories (e.g., random access memory (RAM)), one or more network interfaces (e.g., physical network interfaces (PNICs)), storage 106, and/or other components, as described elsewhere herein. Storage 106 and other example components of an apparatus that may implement host 102 are described elsewhere herein.

Host 102 in system 100 may host a set of one or more microservices 104 (collectively referred to herein as "microservice(s) 104"). The microservice(s) 104 may be deployed using virtual machines (VMs) and/or container(s) implemented on host 102). For example, host 102 may implement a hypervisor (not shown) that abstracts processor, memory, storage, and networking resources of host 102's hardware platform). Generally, a microservice 104 is a loosely coupled and independently deployable service or software that, alone or in combination with one or more other microservices 104, may make up an application. Microservice(s) 104 may enable segmented, granular level functionalities within a larger system infrastructure. A reference to a single microservice 104 can encompass multiple microservices 104, unless context indicates otherwise.

Client device 150 may include a user interface (UI) 152. UI 152 may be usable to communicate with microservice 104 via network 120. For example, communication between client devices 150 and a microservice 104 may be facilitated by one or more application programming interfaces (APIs). An API is a set of rules and protocols that allows different software applications to communicate and share data with each other. Non-exhaustive examples of client devices 150 may include a smartphone, a personal computer, a tablet, or a laptop computer. In some examples, microservice 104 may interact with another microservice, an application, a host, or the like, via network 120.

As shown in FIG. 1, in certain aspects, microservice 104*a* implements a service, which is any network 120 accessible service, e.g., AI fine tuning/training service (e.g., for fine-tuning an LM). In certain aspects, the expert augmentation system is configured to map an event to one or more messages and fine-tune the AI model using the mapping, as described with respect to FIGS. 2-6. In certain aspects, microservice 104*b* implements a service, which is any network 120 accessible service, e.g., an expert augmentation system configured to determine one or more tools using a fine-tuned AI model (e.g., an LM). In certain aspects, expert augmentation system is configured to determine one or more tools using a fine-tuned AI model, where one or more tools are invokable by the fine-tuned model, as described with respect to FIG. 2-6. In certain aspects, at least one microservice 104*c* implements other services that may invoke and/or interact with microservice 104*a* and microservice 104*b*.

Though FIG. 1 depicts host 102, storage 106, and client device 150 as single devices for ease of illustration, host 102, storage 106, and/or client device 150 may be embodied in a variety of forms. Further, though FIG. 1 depicts only one host 102 and one client device 150, other examples may include a different number of hosts 102 and/or client devices 150. Client devices 150 may use any combination of microservices 104 on any host 102 where microservices 104 are deployed.

Example Expert Augmentation System

FIG. 2 depicts an example system 200 according to some embodiments of the present disclosure. System 200 is an expert augmentation system configured to use an AI model to augment an interaction between, for example, a user and an expert. The interaction may be, for example, a conversation, a call, a chat, an email, a meeting, a conference, or any other kind of interaction, any of which may include messages and events associated with a human and/or system. Further, the interaction may take place using text, audio (e.g., voice), images, video, etc.

The AI model may include an LM. LMs are sometimes distinguished as between a "large" LM (LLM) and a "small" LM (SLM) based on the size and complexity of the model, which affects their capabilities and applications. LLMs are trained on vast datasets. SLMs are often trained on smaller datasets compared to LLMs. The training data is typically more focused and less diverse, aimed at specific tasks or domains. While SLMs can still perform various language-related tasks, their performance is usually limited compared to LLMs. However, SLMs require significantly fewer computational resources for training and inference. They can be run on more modest hardware setups, making them suitable for applications with constrained resources or where quick deployment is essential.

AI system 202 of system 200 includes training unit 204 and AI model 206 (e.g., LM, LLM, SLM, etc.), where training unit 204 is configured to fine-tune AI model 206 using training collection 208. Training collection 208 includes message(s) 210 and event(s) 212 associated with an interaction. Tool collection 208 may also include tool parameters 214 and action parameters 216. For example, tool parameters 214 may include the name of a tool, the inputs and outputs of the tool, content from a knowledge base associated with the tool, etc. Similarly, action parameters 216 may include name of an action, description of the action, typical results of the action, association to tool(s), etc. Further, training collection 208 may produce output 218 which may include a stream of message(s) 210 and event(s) 212 associated with the interaction (e.g., an interaction stream, conversation stream, etc.). In addition, output 218 may include tool parameters 214 and action parameters 216.

Training unit 204 receives the stream of message(s) 210 and event(s) 212 and maps event(s) 212 to message(s) 210. For example, an event 212 may be mapped to one or more messages(s) 210 that are within a time delta from the event 212, while message(s) that not within the time delta are not mapped. In addition, event(s) 212 may be related to tasks performed by a user and/or an expert (e.g., a mouse click) and may be an indication of behavior that is closely related to the contents of messages that are mapped. The mapping of event(s) to message(s) may be a step of an event-based labeling process, which is described below in more detail with respect to FIG. 3. In addition, training unit 204 may compare the content of message(s) 210 (e.g., the mapped messages) to content associated with one or more tools (e.g., content of a knowledge base). If the content of messages(s) 210 is similar to the content associated with one or more tools, training unit 204 creates a content-based label that associates message(s) 210 with one or more tools. In certain aspects, training unit 204 may compare the content of message(s) 210 with other tool parameters 214 and/or action parameters to further associate message(s) 210 with tool(s) and/or action(s). The comparison of content of message(s) described above may be a step of a content-based labeling process, which is described below in more detail with respect to FIG. 4. In some aspects, training unit produces output 220 which is used to fine tune AI model 206 and may include content associated with the labeling processes described herein, e.g., labels or other information/data that may cause the fin-tuned AI model 206 to modify its parameters, policies, rules, etc., to determine tool(s). Thus, training unit fine tunes AI model 206 based on the mapping of event(s) 212 to message(s) 210 (or any other steps of the event-based labeling process) and/or the comparison of content of message(s) 210 (e.g., mapped messages) to content associated with tool(s) (or any other steps of the content-based labeling process).

In certain aspects, AI model 206 has been fine-tuned by training unit 204 and is deployed. More specifically, AI model 206 is in communication with stream unit 222, which is configured to process messages, such as message 224 and message 226, and events, such as event 228, of an interaction between a user and an expert. Stream unit 222 is configured to generate an output 230 that is a stream of messages and events (e.g., an interaction stream, conversation stream, etc.). The stream of messages and events may be ordered based on the time that the messages and events occur. Fine-tuned AI model 206 receives output 230, determines tool(s) 232 (e.g., infers tool(s)) that can perform action(s) 234 based on the output 230. Tool(s) 232 are invoked by AI model 206 based on the determination. For example, AI model 206 invokes tool(s) 232 by generating output 236, which may include tool invoking parameters that can be used to invoke tool(s) 232 to perform action(s) 234. Tool(s) 232 may also cause action(s) 234 to be performed by other components of system 200, e.g., by AI system 202, AI model 206, etc., by providing output 238 including parameters that are specific to performing action(s) 234. In certain aspects, one or more actions are performed within an interval of time measured from a start time of a message (e.g., message 224 or message 226) or a start time of an event (e.g., event 228), and the interval of time is shorter than the interval of time for performing similar actions when using conventional expert augmentation systems (e.g., when using periodic tool invocations). Examples of actions 234 include providing, to a user and/or expert, a report associated with accounting and book-keeping, a report including invoices and payments, lending information, a report including project management information, inventory information, a budget report, etc.

Example Event-Based Labeling

Figure 3:
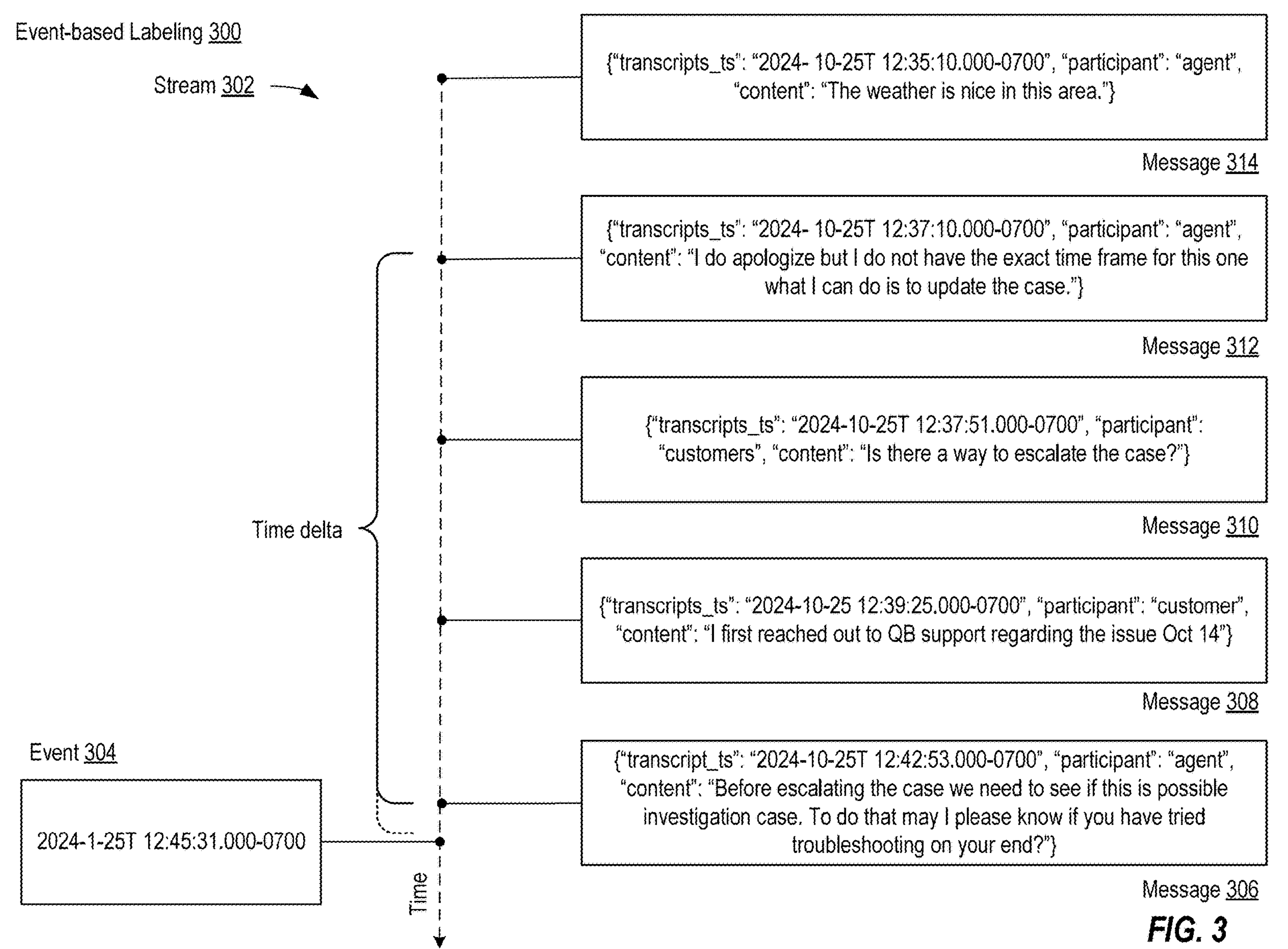
FIG. 3 depicts an example of event-based labeling.

FIG. 3 depicts an example of event-based labeling 300, performed by an expert augmentation system and/or its components, such as system 100 (e.g., host(s) 102) or system 200 (e.g., AI-system 202). The expert augmentation system may receive a stream 302 that includes an event 304 and messages 306, 308, 310, 312, 314. The event-based labeling includes mapping event 304 to messages 306, 308, 310, 312 based on a time delta and a threshold, θ (e.g., 1 minute, 3 minutes, etc.). For example, event 304 and messages 306, 308, 310, 312, 314 are time-stamped. Using time stamps, the expert augmentation system determines a first message 306 that is closest in time to and precedes event 304 and determines additional messages 308, 310, 312, 314 that precede event 304. If a time delta between the first message 306 (or event 304) and the message 312 is within the threshold, θ, the expert augmentation system maps the event 304 to messages 306, 308, 310, 312, where message 312 is the earliest message mapped. If, however, any of the messages, e.g., message 314 and earlier messages, have a time delta that is greater than the threshold, those messages are not mapped. In some aspects, the time delta is determined between two events, and if the time delta is within the threshold, messages that occur between the events are mapped to one or both events. That is, only messages with a time delta that satisfy the threshold are mapped, thereby allowing the expert augmentation system to selectively focus on messages that are close in time to an event and that includes content that is not outdated.

In certain aspects, to perform event-based labeling, the expert augmentation system obtains events from stream 302. The event 304 and/or messages 306, 308, 310, 312 of stream 302 may be associated with one or more tools. Further, messages 306, 308, 310, 312 include content such as transcript data. The expert augmentation system (e.g., training unit 204) maps event 304 to the transcript data. In certain aspects, event-based labeling may include selecting event types to use as a ground truth label (e.g. tool invoking ground truths), which may be used to fine-tune the AI model to determine one or more tools. Example event types include mouse events, keyboard events, display events, etc. Example events include mouse clicks for requesting assistance, clicks for performing a specific search, performing a query, etc. Further, the expert augmentation system may use time stamps of event 304 to determine the closest preceding transcript data, i.e., content of message 306. If a time delta between event 304 and another message (or between two events 304) exceeds a threshold θ, the other messages and their transcript data are ignored and not mapped to the event 304. In certain aspects, the expert augmentation system retrieves a quantity k of preceding messages or portions of messages (e.g., utterances) and maps the preceding k messages or portions of messages to event 304. In certain aspects, mapping event(s) to messages (s) includes joining the event(s) with the message(s) or their content, e.g., to form an event-based label that is used to train an AI-model.

Content-Based Labeling

Figure 4:
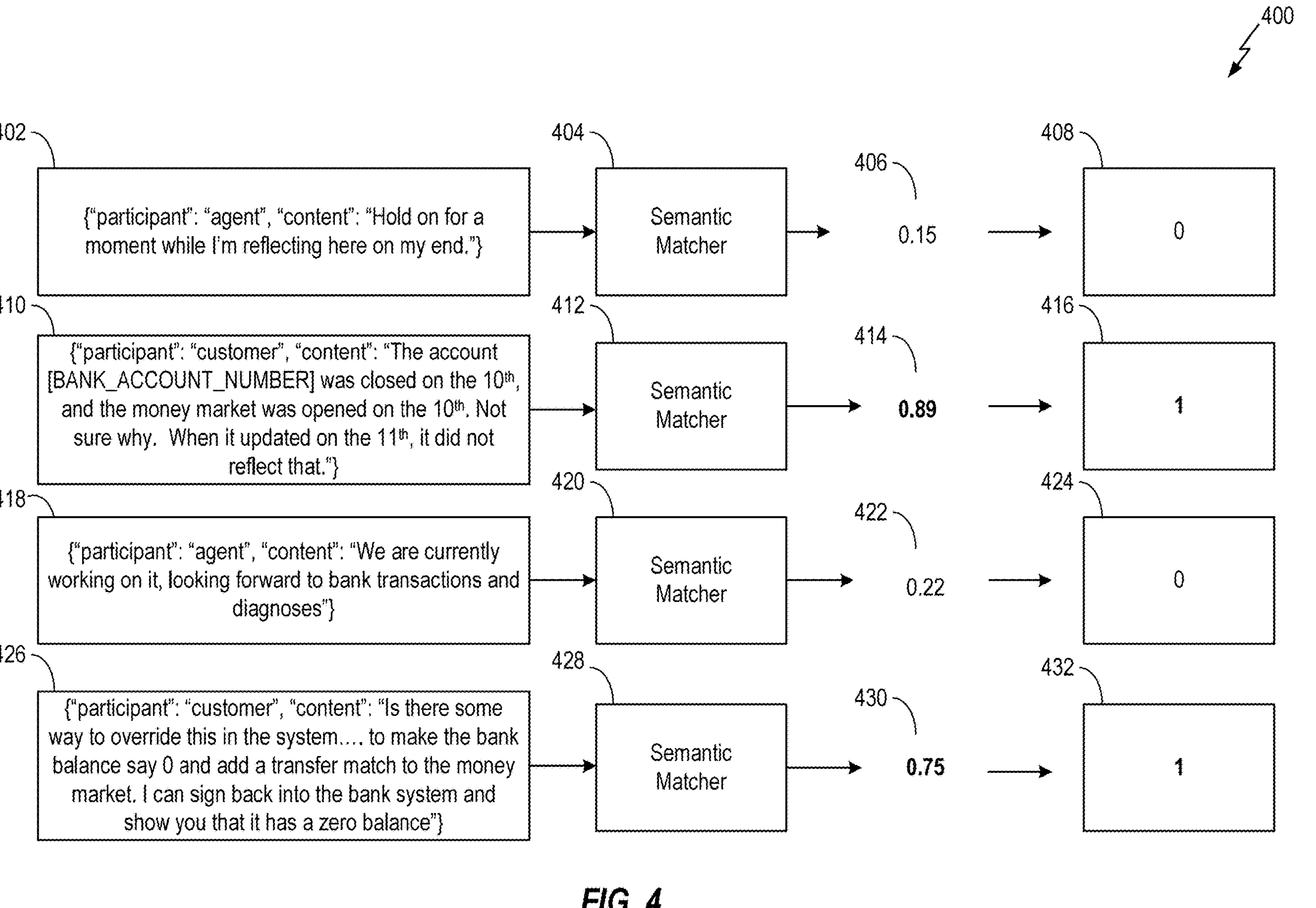
FIG. 4 depicts an example of content-based labeling.

FIG. 4 depicts an example of content-based labeling 400, performed by an expert augmentation system and/or its components, such as system 100 (e.g., host(s) 102) or system 200 (e.g., AI-system 202). The expert augmentation system compares the content of message(s) to content associated with one or more tools (e.g., content of a knowledge base) to determine content-based label(s). For example, the expert augmentation system determines a content-based label based on a similarity measure between content (e.g., transcript data) of a message and content associated with tool(s) (e.g., content from a knowledge base describing the tool). Further, the expert augmentation system assigns the content-based label to a tool if the similarity measure exceeds a similarity threshold. The content of the message may be a portion of the message, such as an utterance, a word, a combination words, etc. In addition, the content associated with a tool may include a tool description that is retrieved form a knowledge base. For example, if the content of the message includes the term "account" and the description of the tool includes the terms "tool configured to provide account information," the similarity measure may be greater than a threshold, and the tool is labeled as recommended tool for invoking when messages including such content are received.

In certain aspects, the content-based labeling 400 is semantic-score-based labeling. More specifically, the expert augmentation system and/or its components (e.g., training unit 204) includes one or more semantic matchers configured to determine a similarity measure between contents (e.g., between the content of a message and the content of a knowledge base). For example, message 402 is received by semantic matcher 404, which determines a similarity measure 406 (i.e., 0.15) based on the content (e.g., transcript data) of message 402 and content associated with a tool (e.g., the content from the knowledge base). The content associated with the tool may be retrieved from a database or other data storage. Because similarity measure 406 does not exceed the similarity threshold, the expert augmentation system determines label 408 (i.e., 0, or false) which indicates that a tool is not recommended for message 402 and/or its content. Further, message 410 is received by semantic matcher 412 which determines a similarity measure 414 (i.e., 0.89) based on the content of message 410 and content associated with a tool. Because similarity measure 414 exceeds the similarity threshold, e.g., 0.7, the expert augmentation system determines label 416 (i.e., 1, or true) which indicates that the tool is recommended for message 410 and/or its content. For example, where the content associated with the tool describes that the tool is configured to generate a report including information about a bank account, the tool is recommended for generating such report associated with the money market account referred to in message 410.

In addition, message 418 is received by semantic matcher 420 which determines a similarity measure 422 (i.e., 0.22) based on content of message 418 and content associated with a tool. Because similarity measure 422 does not exceed the similarity threshold, the expert augmentation system determines label 424 (i.e., 0, or false) which indicates that the tool is not recommended for message 418 or its contents. As another example, message 426 is received by semantic matcher 428, which determines a similarity measure 430 (i.e., 0.75) based on content of message 426 and content associated with a tool. Because similarity measure 430 exceeds the similarity threshold, the expert augmentation system determines label 432 (i.e., 1, or true), which indicates that the tool is recommended for message 426 or its contents. Labels 408, 416, 424, 432. Although various semantic matchers 404, 412, 420, 428 are shown, these similarity matchers may or may not be the same or similar. For example, where the content associated with the tool describes that the tool is configured to override functions of a system and perform transfers between accounts, the tool is recommended in response to the contents of message 426.

As way of example, the similarity measure is represented as Sim(utterance$_i$, retrieved_content$_j$), where Sim is a similarity measure or function, i is an index, utterance$_i$ may refer to messages 402, 410, 418, 426 or their contents (e.g., at least a portion of transcript data), and retrieved_content$_j$ may refer to content that is retrieved from a database or data storage. retrieved_content$_j$ may also refer to a selected message or its contents that includes content that is related to a tool. In this example, a tool (e.g., recommend_tool_x) may be determined or recommended if the similarity measure exceeds the threshold, where the threshold may be chosen empirically or otherwise. The threshold is based on a desirable frequency of content, context of a message, content of the message, or a combination thereof. In some embodiments, the similarity measure is a cosine similarity function.

Example System Architecture of an Expert Augmentation System

Figure 5:
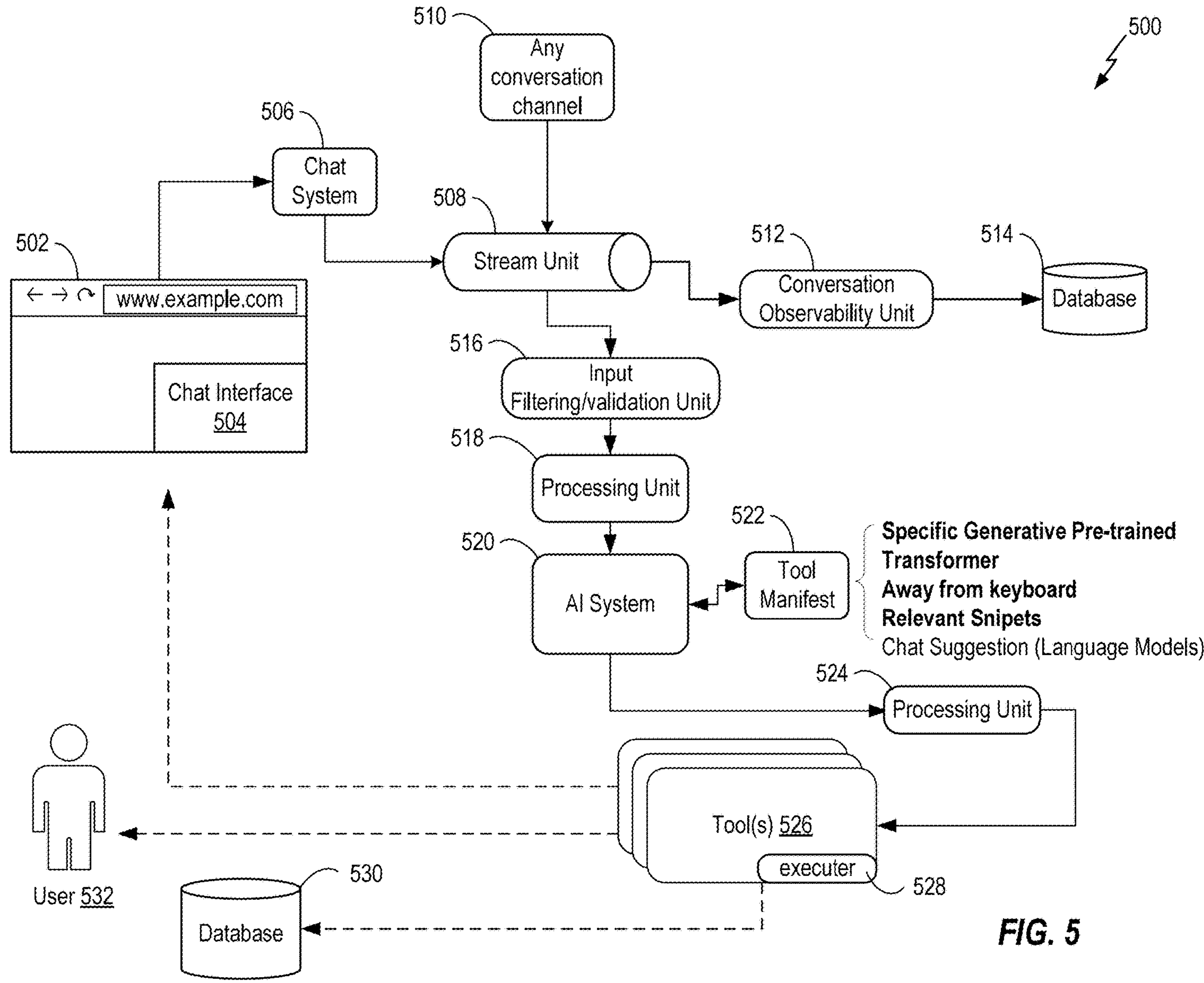
FIG. 5 depicts an example system architecture of a system configured for determining tools and actions.

FIG. 5 depicts an example system architecture of system 500 according to some embodiments of the present disclosure. System 500 is an expert augmentation system and may correspond to system 100 or system 200 of FIGS. 1 and 2, respectively. Further, system 500 may be configured to determine, using a fine-tuned AI model, one or more tools that augment an interaction between a user and an expert.

The AI model may be fine-tuned using any of the methods described with respect to FIGS. 2-4.

In certain aspects, system 500 includes a user interface 502 configured to provide functionality for an interaction between a user and an expert. For example, the user interface 502 may be a webpage of a website (e.g., www.example.com) to which the user logs on to interact with an expert and receive customer service from the expert. The user interface 502 is configured to render chat interface 504 and communicate with chat system 506 (e.g., a backend chat system). Chat interface 504 is configured to facilitate communication between the user and the expert, such as via user interface 502 and chat system 506. For example, chat interface 504 can be configured to receive inputs from the user and transmit the inputs to chat system 506, which is directly or indirectly accessible by the expert. Chat interface 504 can also be configured to display other inputs from the expert, such that an interaction (e.g., conversation) between the user and expert is facilitated, and display information associated with actions and tools to augment the interaction. In one example, the inputs include messages and events. Example messages include text, audio, images, video, etc. Examples of events include actions and/or behavior information associated with the user, the expert, the system, etc. Information associated with actions includes reports generated using tools.

Chat system 506 is configured to receive the messages and events and make the messages and events available to stream unit 508. Stream unit 508 may be configured to generate a stream of messages and events. The messages and events in the stream may be time stamped, and the messages may include transcript data. Further, the messages and events in the stream may include metadata related to the user, message, event type, etc. In certain aspects, user interface 502, chat interface 504, and chat system 506 may be collectively referred to as a channel. The stream of stream unit 508 also includes messages and events from any other channel(s) 510, which may be similar to user interface 502, chat interface 504, and chat system 506.

In addition, conversation observability unit 512 is configured to store the stream in a database 514, which is accessible by other components of system 500 to perform any actions described herein. For example, conversation observability unit 512 is configured to store the stream or data associated with the stream when the stream includes specific events. In another example, database 514 is configured to store or make available the stream in accordance with certain callback functions (e.g., call back hooks associated with Hypertext Transfer Protocol (HTTP)).

Input filtering and validation unit 516 is configured to filter and validate the contents of the stream generated by stream unit 508 and produce an output including the filtered and validated contents. For example, events and messages in the stream are filtered and validated based on the channel type or any other characteristic. Input filtering and validation unit 516 may also be configured to filter and validate the contents of stream based on requirements imposed by other components of system 500. Processing unit 518 is configured to process the output from input filtering and validation unit 516 to facilitate further processing of events and messages by other components of system 500. For example, other components subscribe to processing unit 518 to receive specific events and messages.

System 500 includes AI system 520 which is configured to determine, using a fine-tuned AI model, tool(s) 526 that can be used to augment the interaction between a user and an expert. For example, AI system 520 may obtain, from tool manifest 522, information about tools that are available and invokable by AI system 520. In certain aspects, tool manifest 522 is a container of tool information including tool parameters. Example of a container may include a file that includes the tool information. Examples of the parameters associated with the tool include a tool name, tool function name, tool description, tool identifier, user identifier of user associated with the tool, expert identifier of an expert associated with the tool, interaction identifier (e.g., conversation identifier), event types associated with the tool, message type associated with the tool, transcript data associated with the tool, etc.

Further, tool manifest 522 is generated using a generative pre-trained transformer (GPT) configured specifically for creating the manifest and the tool parameters. The GPT may be "away from keyboard," which may refer to a GPT that does not require user input. The GTP also provides "relevant snippets" sections of the manifest that are relevant to the tools 526 and a related interaction (e.g., a conversation or chat that includes events and messages), which can be augmented or improved by using tools 526. Thus, AI system 520 may determine one or more tools 526 using the contents of tool manifest 522 and in accordance with the fine-tuning of its AI model.

In certain aspects, tool(s) 526 are external to AI system 520, user interface 502, chat interface 504, chat system 506, etc. For example, a tool 526 is stored in and executable by another component of system 500 or any other system. Further, one or more tools 526 are invokable, by AI system 520, e.g., by transmitting tool parameters obtained from tool manifest 522. The parameters may be processed by processing unit 524 which may be configured to process tool invocations based on the parameters and pass the processed tool invocations to an executer 528 (e.g., a processing system) executes tools 526.

Tools 526 are configured to perform actions or cause actions to be performed. In certain aspects, system 500 uses the output of tools 526 to perform actions. For example, AI system 520 determines that actions needed to be performed to augment the interaction between a user and an expert and determines based on tool parameters that a certain tool can be invoked to provide an output with information that is usable to perform the actions. The actions may include at least one causing AI system 520 (including a fine-tuned AI model) to generate text based on the output, causing an API to provide data associated with the one or more tools, or causing another artificial intelligence model to perform another action associated with the one or more tools.

Tools 526 determined by AI system 520 may be stored in database 530. For example, the stored tools 526 may be retrieved by AI system 520 or any other component based on tool parameters, e.g., to avoid having to re-determine what tools 536 to recommend for an interaction. Further, tools 536 may be associated with a specific user 532 (e.g., based on input provided by the user on chat interface 504), and the results of actions performed by tools 526 or other components of system 500 can be provided to user 532 via chat interface 504.

Figure 6:
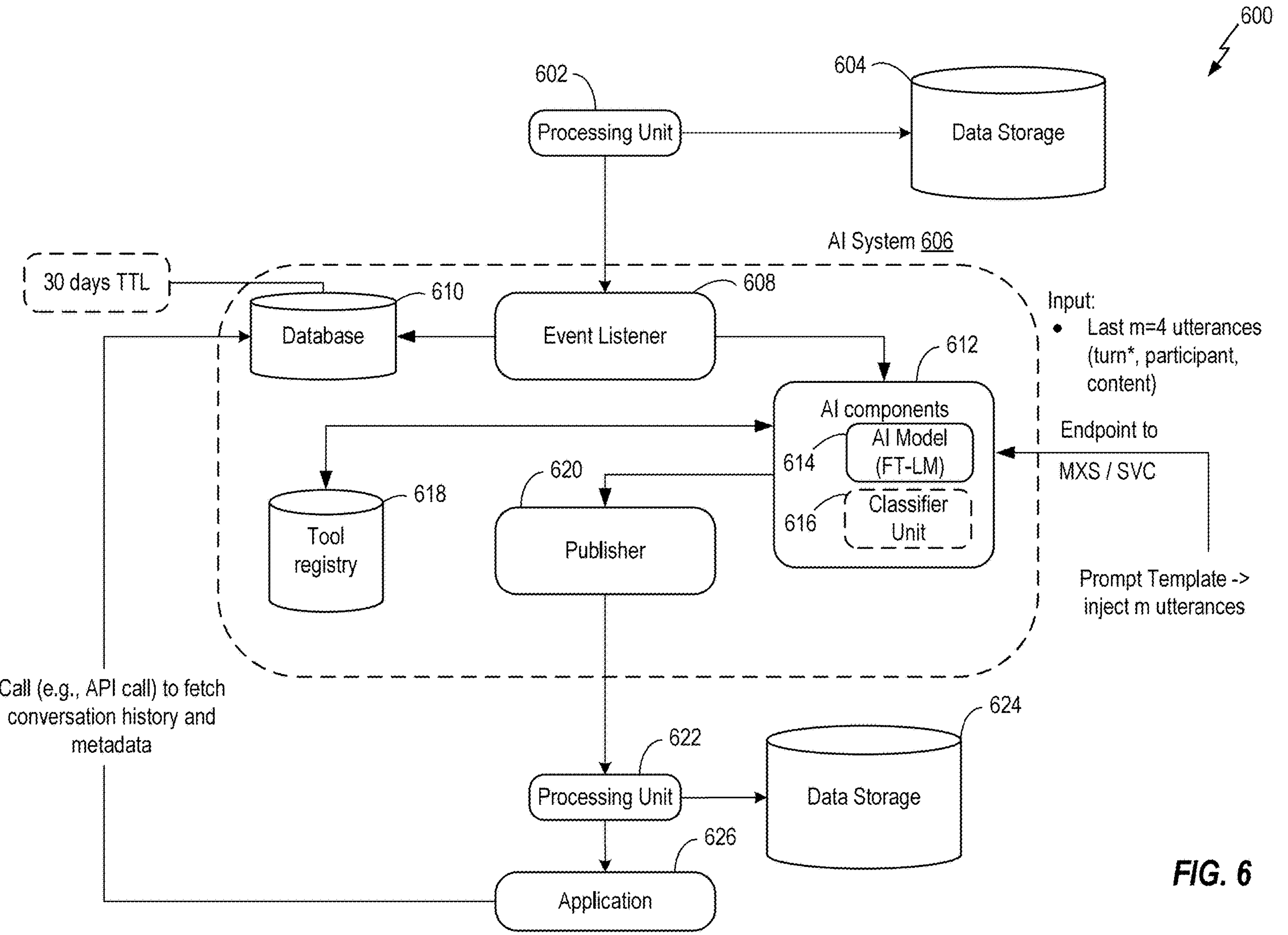
FIG. 6 depicts another example system architecture of another system configured for determining tools and actions.

FIG. 6 depicts an example architecture of a system 600, which includes shows the components of an AI system, such as AI system 520 shown in FIG. 5, and additional components, such as a data storage and an application. More specifically, processing unit 602 is configured to process the output from other components to facilitate processing of events and messages. For example, processing unit 602 may refer to processing unit 518 of FIG. 5 and may perform similar functions. Further, processing unit 602 stores processed events and messages in data storage 604.

AI system 606 may refer to AI system 202 of FIG. 2 and/or AI system 520 of FIG. 5. AI system 606 includes event listener 608, database 610, and AI components 612. Event listener 608 is configured to detect events, messages, and related content. Event listener 608 also provides events, related messages, and content to database 610 for storage and to AI components 612 for AI components 612 to determine one or more tools. The stored events and related messages may be referred to as interaction history. AI components 612 or any other components may retrieve the events, related messages, and metadata from database 610. In addition, the events, related messages, and metadata are saved in database 610 for a specific time interval based on a time to live (TTL) parameter, e.g., saved for 30 days when TTL is 30 days.

AI components 612 include AI model 614 and a classifier unit 616, which may be configured to classify inputs to AI model 614. AI model 614 may be configured to perform the same functions as AI system 520. AI system 606 also includes tool registry 618 and publisher 620. Tool registry 618 is configured to register tools and make the registered tools available for retrieval by other components. For example, tools are relevant to a particular interaction between a user and an expert may be pre-registered in tool registry 618 as tools that can be retrieved by AI components 612 based on the messages and events of the interaction. In some embodiments, tools are registered in tool registry 618 before, during, or after training of the AI model 614. In some embodiments, tool registry 618 is configured to store a tool manifest.

Publisher 620 is configured to publish tools and/or tool parameters (e.g., tool invocation parameters) that are passed to processing unit 622. Processing unit 622 may correspond to processing unit 524 and perform similar functions. Further, processing unit 622 is configured to organize the published tools and/or tool parameters and store them in data storage 624. Application 626 is configured to execute tools that are published by publisher 620. In certain aspects, application 626 is configured to retrieve published tools and/or tool parameters stored in data storage 624. Further, application 626 is configured to fetch messages, events, and metadata that are stored in database 610 and execute a tool based on the fetched messages and events. For example, application 626 may fetch messages and events by making a call, such as an application programming interface (API) call, to database 610 in order to fetch historical messages, history and metadata. This is beneficial at least because AI model 614 can invoke tools by transmitting tool parameters (without messages or events) to application 626 which retrieves messages and events from database 610 to execute the tools using the content of the retrieved messages and events.

In certain aspects, AI model 614 may be fine-tuned as described herein. For example, AI components 612 receive prompt templates to inject a specified quantity m of utterances. An input to AI components 612 may include the last four utterances (i.e., m=4) that include a term including characters "turn", that are associated with a participant and content. The injected utterances may be used to determine messages that are mapped to an event for which a tool can be invoked. Further, the prompt templates may be provided via an endpoint such as an HTTP endpoint.

In certain aspects, a prompt is used for generating inferences such that the fine-tuned LM minimizes latency associated with interaction between the user and the expert, the determination of tools, and the performing of related actions, while maintaining accuracy through offline evaluation. In certain aspects, a maximum number of tokens (e.g., n_token) or set of tokens associated with LM parameters that meet different generation criteria may be specified. In addition, the maximum number of tokens or set of tokens may be included as an LM parameter governing the generated output of the LM. In certain aspects, an instruction fine-tuned model as a base model, which is fine-tuned using labeled data and a low rank adaptation of a LM technique (e.g., Low-Rank Adaptation (LoRA) or Quantized LoRA (QLoRA)). Further, the expert augmentation system deploys the fine-tuned model and makes an API endpoint available (e.g., for providing tool information).

In certain aspects, an event listener (e.g., event listener 608) listens or receives a conversation stream published within a short period of time. For example, the event listener receives a message and its content from the upstream (e.g., from an input filtering and validation unit). The message may be referred to as an utterance (e.g., a unit message that comprises conversation data (e.g., transcript data) defined by a session identifier). The event listener retrieves metadata, e.g., Internet Exchange Points (IXP) IXP metadata (experiment_id and treatment_id) from the stream and determines to call AI components (e.g., AI components 612). In this example, the call is made if treatment_id requires an LM call. Otherwise, messages are skipped downstream via cache. Further, a database (e.g., database 610) is configured to cache messages (and events). For example, the database is a transient in-memory database and may serve the API endpoint for multiple consumers.

In certain aspects, the expert augmentation system described herein leverages the comprehension ability of an AI model, instead of its generation ability. For example, the AI model is a lightweight LLM that is fast, responsive, and understands the domain knowledge and conversational contexts of messages in an interaction. For example, the expert augmentation system is configured to process interactions within an interval of time, e.g., within 500 milliseconds, which is shorter than the interval of time that conventional expert augmentation systems require. In some other embodiments, the expert augmentation system invokes the best tool only when the tool is needed. In other words, the expert augmentation system is not constrained by periodic tool invocation of conventional expert augmentation systems.

Example Method for Fine Tuning a Language Model

Figure 7:
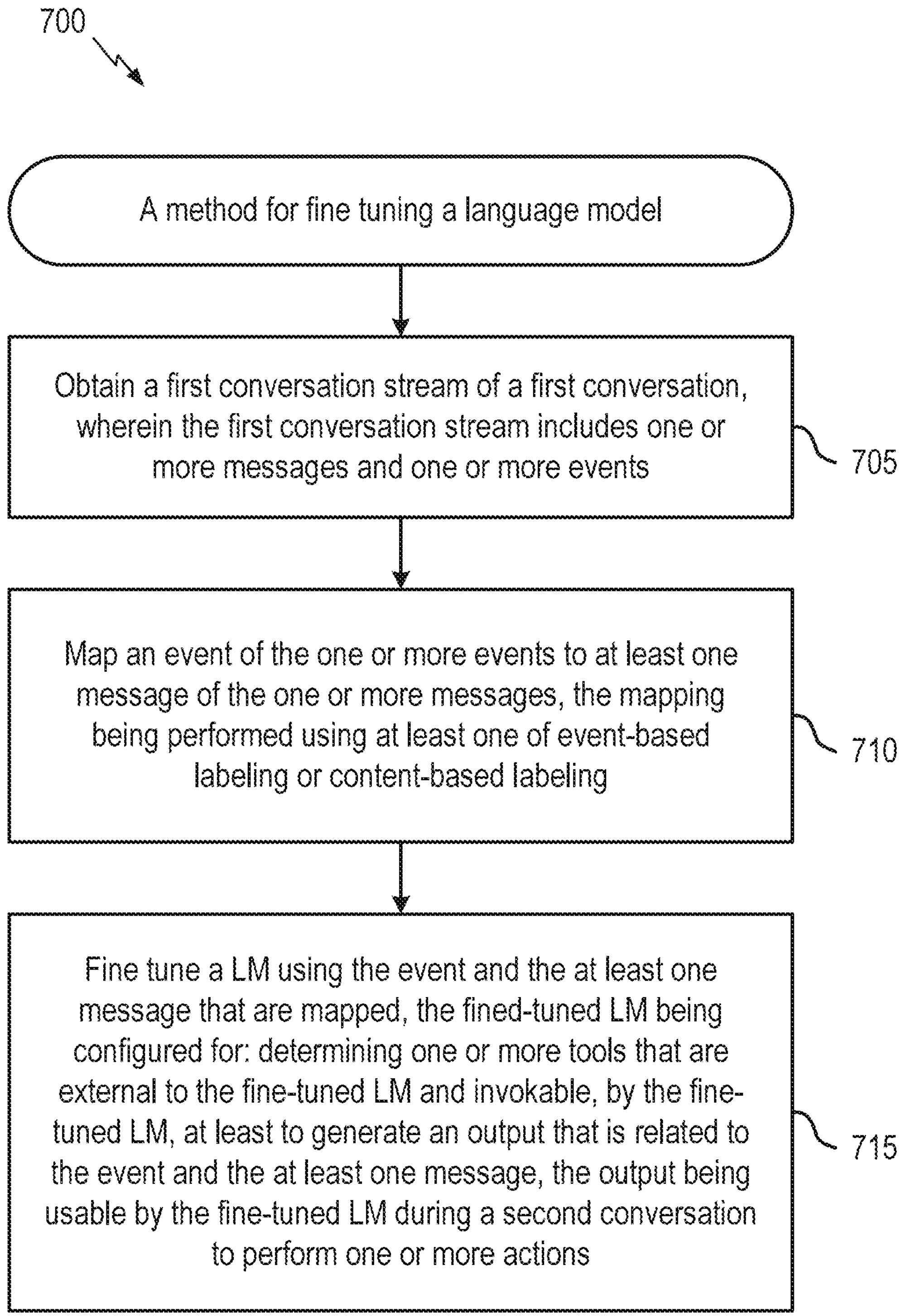
FIG. 7 depicts a schematic flow chart diagram of an example method for fine tuning a language model.

FIG. 7 depicts an example method 700 for fine tuning a language model. In some aspects, method 700 can be implemented by systems or any of their components described herein, such as system 100 of FIG. 1, system 200 of FIG. 2, system 500 of FIG. 5, system 600 of FIG. 6, and processing system 900 of FIG. 9.

Method 700 begins at block 705 with obtaining a first conversation stream of a first conversation, wherein the first conversation stream includes one or more messages and one or more events. This is described at least in connection with output 218 from training collection 208 in FIG. 2, where training unit 204 receives output 218 including a stream of message(s) 210 and event(s) 212 associated with the interaction (e.g., an interaction stream, conversation stream, etc.).

Method 700 then proceeds to block 710 with mapping an event of the one or more events to at least one message of the one or more messages, the mapping being performed using at least one of event-based labeling or content-based labeling. This is described at least in connection with training unit 204 in FIG. 2, which maps event(s) 212 to message(s) 210 as a step of an event-based labeling process and performs a comparison of content as a step of content-based labeling process.

Method 700 then proceeds to block 715 with fine tuning a LM using the event and the at least one message that are mapped, the fined-tuned LM being configured for: determining one or more tools that are external to the fine-tuned LM and invokable, by the fine-tuned LM, at least to generate an output that is related to the event and the at least one message, the output being usable by the fine-tuned LM during a second conversation to perform one or more actions. This is described at least in connection with training unit 204 in FIG. 2, which fine tunes AI model 206 based on the mapping of event(s) 212 to message(s) 210 (or any other steps of the event-based labeling process) and/or the comparison of content of message(s) 210 (e.g., mapped messages) to content associated with tool(s) (or any other steps of the content-based labeling process).

In some aspects, the mapping is performed using the event-based labeling, and block 710 includes determining an event type corresponding to the event, the event type being a label that is input to the LM. This is described at least in connection with system 200 in FIG. 2, which performs event-based labeling. This is also described with respect to the event-based labeling in FIG. 3, where the event-based labeling includes selecting event types to use as a ground truth label, which may be used to fine-tune the AI model to determine one or more tools.

In some aspects, the event type is a ground truth label for determining the one or more tools. This is described at least in connection with system 200 in FIG. 2, which performs event-based labeling. This is also described with respect to the event-based labeling in FIG. 3, where the event-based labeling includes selecting event types to use as a ground truth label, which may be used to fine-tune the AI model to determine one or more tools.

In some aspects, the mapping is performed using the event-based labeling, block 710 includes determining a first message of the at least one message that is closest in time to and precedes the event, and the method 700 further comprises determining one or more additional messages of the at least one message that precede the first message, wherein a time delta between the earliest message of the one or more additional messages and the first message is within a threshold. This is described at least in connection with AI system 202 in FIG. 2, which performs the event-based labeling in FIG. 3, including determining a first message 306 that is closest in time to and precedes event 304 and determines additional messages 308, 310, 312 that precede event 304. If a time delta between the first message 306 (or event 304) and the earliest message 312 is within a threshold, θ, the expert augmentation system maps the event 304 to messages 306, 308, 310, 312.

In some aspects, the first message and the one or more additional messages comprise transcript data, and block 710 includes joining the transcript data with the event. This is described at least in connection with AI system 202 in FIG. 2, which performs the event-based labeling in FIG. 3, where messages 306, 308, 310, 312 include content such as transcript data, and the mapping includes joining the event(s) with the message(s) or their content, e.g., to form an event-based label that is used to train an AI-model.

In some aspects, the mapping is performed using the event-based labeling, the event is a label usable to fine tune the LM, and the at least one message is input data usable to fine tune the LM. This is described at least in connection with AI system 202 in FIG. 2, which performs the event-based labeling in FIG. 3, where messages 306, 308, 310, 312 include content such as transcript data, and the mapping includes joining the event(s) with the message(s) or their content, e.g., to form an event-based label that is used to train an AI-model.

In some aspects, the mapping is performed using the content-based labeling, and block 710 includes: determining a content-based label based on a similarity measure between transcript data of the at least one message and a selected message; and selecting the content-based label as a tool of the one or more tools if the similarity measure exceeds a similarity threshold. This is described at least in connection with AI system 202 in FIG. 2, which performs the content-based labeling in FIG. 4, which determines a content-based label based on a similarity measure between content (e.g., transcript data) of a message and content associated with tool(s) (e.g., retrieved_content$_j$ may also refer to a selected message).

In some aspects, block 715 includes setting an input limit and an output limit for a prompt of the LM based on a quantity of tokens, the input limit and the output limit being set to satisfy a latency threshold of the LM. This is described at least in connection with AI system 606 in FIG. 6, which uses a prompt at least for fine-tuning the LM.

In some aspects, the quantity of tokens is at least one of a maximum quantity of tokens that meets a generation criterion or a set of tokens associated with one or more LM parameters. This is described at least in connection with AI system 606 in FIG. 6, which uses a prompt at least for fine-tuning the LM, and a maximum number of tokens or set of tokens are specified.

In some aspects, method 700 further includes deploying the fine-tuned LM in a system. This is described at least in connection with AI model 206 in FIG. 2, which has been fine-tuned by training unit 204 and is deployed.

In some aspects, method 700 further includes using the deployed fine-tuned LM to: determine the one or more tools while the second conversation is ongoing and perform the one or more actions using the one or more tools. This is described at least in connection with AI model 206 in FIG. 2, where the fine-tuned AI model 206 receives output 230, determines tool(s) 232 (e.g., infers tool(s)) that can perform action(s) 234 based on the output 230.

In some aspects, the one or more actions are performed within an interval of time measured from a start time of a corresponding message of the second conversation. This is described at least in connection with AI model 206 in FIG. 2, which invokes one or more tools to perform actions within an interval of time measured from a start time of a message (e.g., message 224 or message 226) or a start time of an event (e.g., event 228).

Method 700 represents a technical improvement over the art because an LM is fine-tuned (block 715) using an event and one or more messages that are mapped (block 710). By mapping an event to one or more messages, the expert augmentation system is able to selectively focus on messages that are related to the event and/or a tool to fine-tune the LM (block 715), while ignoring messages that are not. Further, by mapping an event to one or more messages that have a time delta that satisfies a threshold, the expert augmentation system is able to selectively focus on one or more messages that are within a reduced time interval, while ignoring the messages that are not. That is, the messages that are not related to the event or not within the time delta do not need to be processed by the expert augmentation system in order to fine tune the LM. Thus, method 800 and/or the expert augmentation system described herein fine-tune the LM to invoke tools by processing a reduced quantity of messages, thereby improving resource utilization, including utilization of compute memory and/or network bandwidth used to process the messages.

Further, the fined-tuned LM (block 715) of method 700 also represents a technical improvement over the art at least because the fine-tuned LM can be deployed to invoke tools in accordance with the mapping, thereby allowing the fine-tuned LM to also process a reduced quantity of messages which improves resource utilization, including utilization of compute memory and/or network bandwidth.

Further, at least because the expert augmentation system including the fine-tuned LM described herein does not need to periodically invoke tools, the expert augmentation system is able to rapidly respond to messages during the interaction and therefore meet service level agreements (SLAs) of, for example, other interacting microservices. In other words, another technical improvement of method 700 is one or more tools can be invoked immediately after the expert augmentation system receives event(s) and message(s) that are in accordance with the mapping, without having to wait for a fixed interval of time to elapse before the tool is invoked. This avoids situations typical of conventional expert augmentation systems where the user transmits additional messages in order to emphasize the immediate nature of the message, thereby avoiding processing of additional messages, additional tool invocations, and the resulting additional consumption of resources.

Note that FIG. 7 is just one example of a method, and other methods including fewer, additional, or alternative operations are possible consistent with this disclosure.

Example Method for Determining Tools and Performing Actions

FIG. 8 depicts an example method 800 for determining tools and performing actions. In one aspect, method 800 can be implemented by systems or any of their components described herein, such as system 100 of FIG. 1, system 200 of FIG. 2, system 500 of FIG. 5, system 600 of FIG. 6, and processing system 900 of FIG. 9.

Method 800 begins at block 805 with receiving a conversation stream of a conversation, wherein the conversation stream includes one or more messages and one or more events. This is described at least in connection with AI-model 206 in FIG. 2, which receives output 230 from stream unit including messages 224, 224 and event 228.

Method 800 then proceeds to block 810 with determining, using a fine-tuned LM, one or more tools that are external to the fine-tuned LM and invokable, by the fine-tuned LM, at least to generate an output that is related to an event and at least one message that is mapped by the fine-tuned LM to the event, the output being usable by the fine-tuned LM during the conversation to cause one or more actions to be performed, the fine-tuned LM being pretrained using at least one of event-based labeling or content-based labeling. This is described at least in connection with AI model 206 in FIG. 2, which is fine-tuned based on the mapping of event(s) 212 to message(s) 210 and determines tool(s) 232 (e.g., infers tool(s)) that can perform action(s) 234 based on the output 230. Tool(s) 232 are invoked by AI model 206 based on the determination.

Method 800 then proceeds to block 815 with causing one or more actions to be performed based on the output generated by the one or more tools. This is described at least in connection with AI model 206 in FIG. 2, which causes actions 234 to be performed.

In some aspects, the one or more tools are determined based on an event type. This is described at least in connection with AI model 206 in FIG. 2, which is fined tuned using event types (as a ground truth label), and the fine-tune AI model determines one or more tools based on the fine-tuning.

In some aspects, the fine-tuned LM is configured with a prompt having an input limit and an output limit LM that is based on a quantity of tokens, the input limit and the output limit being set to satisfy a latency threshold of the LM. This is described at least in connection with AI system 606 in FIG. 6, which uses a prompt.

In some aspects, the quantity of tokens is at least one of a maximum number of tokens that meets a generation criterion or a set of tokens of one or more LM parameters. This is described at least in connection with AI system 614 in FIG. 6, which uses a prompt, and a maximum number of tokens or set of tokens are specified.

In some aspects, the one or more actions are performed within an interval of time measured from a start time of a corresponding message of the conversation. This is described at least in connection with AI model 206 in FIG. 2, which invokes one or more tools to perform actions within an interval of time measured from a start time of a message (e.g., message 224 or message 226) or a start time of an event (e.g., event 228).

In some aspects, method 800 further includes invoking, in response to the determination of the one or more tools, one or more functions (e.g., actions) corresponding to the one or more tools based on at least one parameter. This is described at least in connection with AI system 520 (including an AI model) of FIG. 5, which determines based on tool parameters that a certain tool can be invoked to provide an output with information that is usable to perform the actions.

In some aspects, the one or more actions include at least one of: causing the fine-tuned LM to generate text based on the output; causing an API to provide data associated with the one or more tools; or causing another artificial intelligence model to perform another action associated with the one or more tools. This is described at least in connection with AI system 520 (including an AI model) of FIG. 5, which determines tools to perform the actions which include causing the fine-tuned LM to generate text based on the output; causing an API to provide data associated with the one or more tools; or causing another artificial intelligence model to perform another action associated with the one or more tools.

Method 800 (e.g., fine-tuned LM (block 810)) represents a technical improvement over the art at least because the fine-tuned LM can be deployed to invoke tools in accordance with the mapping, thereby allowing the fine-tuned LM to process a reduced quantity of messages which improves resource utilization, including utilization of compute memory and/or network bandwidth.

In addition, method 800 represents a technical improvement over the art at least because method 800 described herein does not need to periodically invoke tools. That is method 800 is able to rapidly respond to messages during the interaction. More specifically, method 800 and/or the expert augmentation system can invoke one or more tools immediately after the expert augmentation system receives messages and an event that are in accordance with the mapping, without having to wait for a fixed interval of time to elapse before the tool is invoked. This avoids situations typical of conventional expert augmentation systems where the user transmits additional messages in order to emphasize the immediate nature of the message, thereby avoiding processing of additional messages, additional tool invocations, and the resulting additional consumption of resources.

Note that FIG. 8 is just one example of a method, and other methods including fewer, additional, or alternative operations are possible consistent with this disclosure.

Example Processing System

Figure 9:
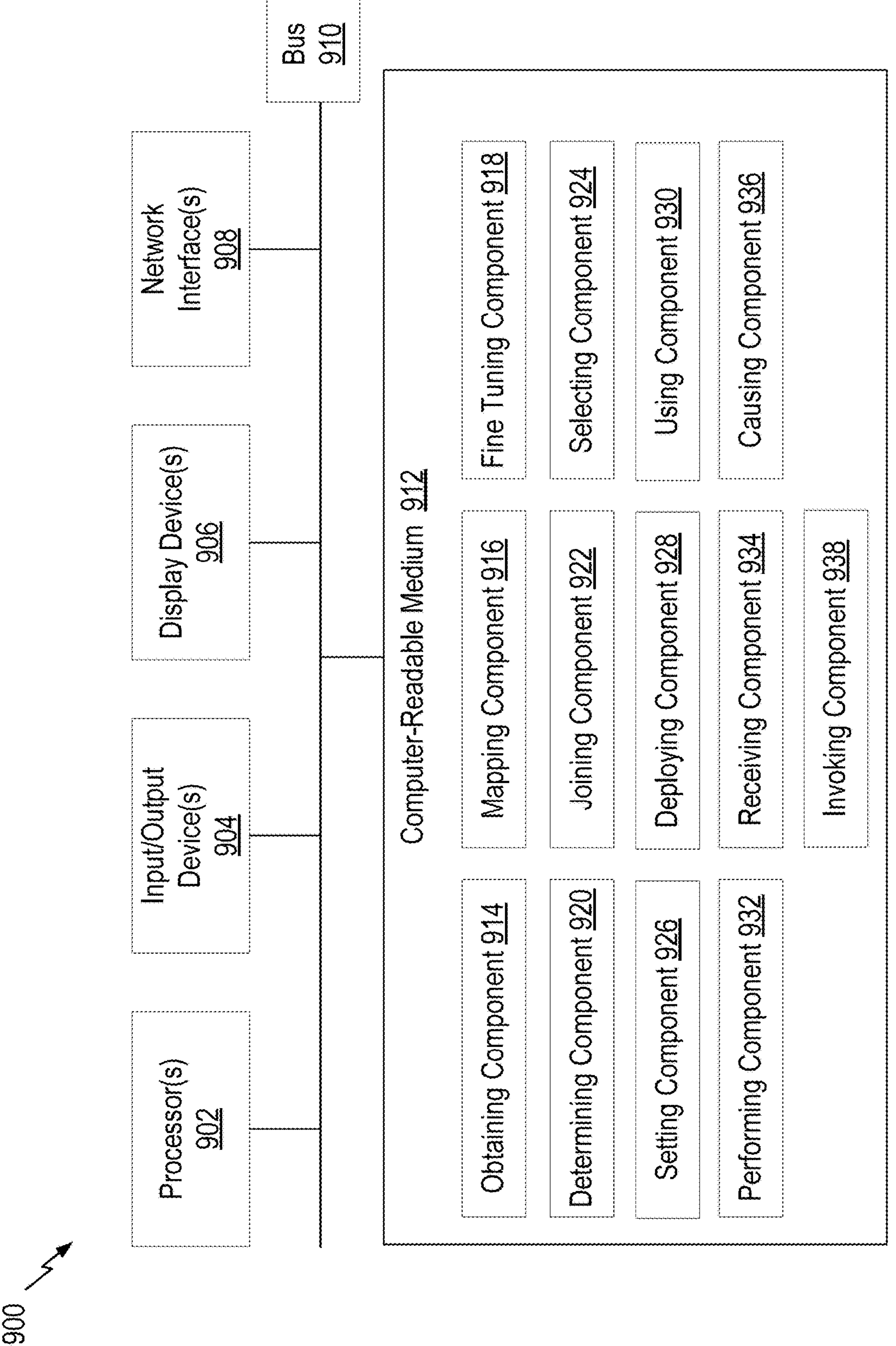
FIG. 9 depicts an example processing system with which aspects of the present disclosure can be performed.

FIG. 9 depicts an example processing system 900 configured to perform various aspects described herein, including, for example, method 700 as described above with respect to FIG. 7 and/or method 800 as described above with respect to FIG. 8.

Processing system 900 is generally be an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 900 includes one or more processors 902, one or more input/output devices 904, one or more display devices 906, one or more network interfaces 908 through which processing system 900 is connected to one or more networks (e.g., a local network, an intranet, the Internet, or any other group of processing systems communicatively connected to each other), and computer-readable medium 912. In the depicted example, the aforementioned components are coupled by a bus 910, which may generally be configured for data exchange amongst the components. Bus 910 may be representative of multiple buses, while only one is depicted for simplicity.

Processor(s) 902 are generally configured to retrieve and execute instructions stored in one or more memories, including local memories like computer-readable medium 912, as well as remote memories and data stores. Similarly, processor(s) 902 are configured to store application data residing in local memories like the computer-readable medium 912, as well as remote memories and data stores. More generally, bus 910 is configured to transmit programming instructions and application data among the processor(s) 902, display device(s) 906, network interface(s) 908, and/or computer-readable medium 912. In certain embodiments, processor(s) 902 are representative of a one or more central processing units (CPUs), graphics processing unit (GPUs), tensor processing unit (TPUs), accelerators, and other processing devices.

Input/output device(s) 904 may include any device, mechanism, system, interactive display, and/or various other hardware and software components for communicating information between processing system 900 and a user of processing system 900. For example, input/output device(s) 904 may include input hardware, such as a keyboard, touch screen, button, microphone, speaker, and/or other device for receiving inputs from the user and sending outputs to the user.

Display device(s) 906 may generally include any sort of device configured to display data, information, graphics, user interface elements, and the like to a user. For example, display device(s) 906 may include internal and external displays such as an internal display of a tablet computer or an external display for a server computer or a projector. Display device(s) 906 may further include displays for devices, such as augmented, virtual, and/or extended reality devices. In various embodiments, display device(s) 906 may be configured to display a graphical user interface.

Network interface(s) 908 provide processing system 900 with access to external networks and thereby to external processing systems. Network interface(s) 908 can generally be any hardware and/or software capable of transmitting and/or receiving data via a wired or wireless network connection. Accordingly, network interface(s) 908 can include a communication transceiver for sending and/or receiving any wired and/or wireless communication.

Computer-readable medium 912 may be a volatile memory, such as a random access memory (RAM), or a nonvolatile memory, such as nonvolatile random access memory (NVRAM), or the like. In this example, computer-readable medium 912 includes obtaining component 914, mapping component 916, fine tuning component 918, determining component 920, joining component 922, selecting component 924, setting component 926, deploying component 928, using component 930, performing component 932, receiving component 934, causing component 936, and invoking component 938. Processing of the components 914-938 may enable and cause the processing system 900 to perform: the method 700 described with respect to FIG. 7, or any aspect related to it; and/or the method 800 described with respect to FIG. 8, or any aspect related to it.

In certain embodiments, obtaining component 914 is configured to obtain a first conversation stream of a first conversation, wherein the first conversation stream includes one or more messages and one or more events, as described in FIG. 7 with reference to block 705. In certain embodiments, mapping component 916 is configured to map an event of the one or more events to at least one message of the one or more messages, the mapping being performed using at least one of event-based labeling or content-based labeling, as described in FIG. 7 with reference to block 710. In certain embodiments, fine tuning component 918 is configured to fine tune a LM using the event and the at least one message that are mapped, the fined-tuned LM being configured for: determining one or more tools that are external to the fine-tuned LM and invokable, by the fine-tuned LM, at least to generate an output that is related to the event and the at least one message, the output being usable by the fine-tuned LM during a second conversation to perform one or more actions, as described in FIG. 7 with reference to block 715.

In certain embodiments, receiving component 934 is configured to receive a conversation stream of a conversation, wherein the conversation stream includes one or more messages and one or more events, as described in FIG. 8 with reference to block 805. In certain embodiments, determining component 920 is configured to determine, using a fine-tuned LM, one or more tools that are external to the fine-tuned LM and invokable, by the fine-tuned LM, at least to generate an output that is related to an event and at least one message that is mapped by the fine-tuned LM to the event, the output being usable by the fine-tuned LM during the conversation to cause one or more actions to be performed, the fine-tuned LM being pretrained using at least one of event-based labeling or content-based labeling, as described in FIG. 8 with reference to block 810. In certain embodiments, causing component 936 is configured to cause one or more actions to be performed based on the output generated by the one or more tools, as described in FIG. 8 with reference to block 815.

Note that FIG. 9 is just one example of a processing system consistent with aspects described herein, and other processing systems having additional, alternative, or fewer components are possible consistent with this disclosure.

EXAMPLE CLAUSES

Implementation examples are described in the following numbered clauses:

Clause 1: A method, comprising: obtaining a first conversation stream of a first conversation, wherein the first conversation stream includes one or more messages and one or more events; mapping an event of the one or more events to at least one message of the one or more messages, the mapping being performed using at least one of event-based labeling or content-based labeling; and fine tuning a LM using the event and the at least one message that are mapped, the fined-tuned LM being configured for: determining one or more tools that are external to the fine-tuned LM and invokable, by the fine-tuned LM, at least to generate an output that is related to the event and the at least one message, the output being usable by the fine-tuned LM during a second conversation to perform one or more actions.

Clause 2: The method of Clause 1, wherein: the mapping is performed using the event-based labeling, and the mapping comprises determining an event type corresponding to the event, the event type being a label that is input to the LM.

Clause 3: The method of Clause 2, wherein the event type is a ground truth label for determining the one or more tools.

Clause 4: The method of any one of Clauses 1-3, wherein: the mapping is performed using the event-based labeling, the mapping comprises determining a first message of the at least one message that is closest in time to and precedes the event, and the method further comprises determining one or more additional messages of the at least one message that precede the first message, wherein a time delta between the earliest message of the one or more additional messages and the first message is within a threshold.

Clause 5: The method of Clause 4, wherein: the first message and the one or more additional messages comprise transcript data, and the mapping further comprises joining the transcript data with the event.

Clause 6: The method of any one of Clauses 1-5, wherein: the mapping is performed using the event-based labeling, the event is a label usable to fine tune the LM, and the at least one message is input data usable to fine tune the LM.

Clause 7: The method of any one of Clauses 1-6, wherein: the mapping is performed using the content-based labeling, and the mapping comprises: determining a content-based label based on a similarity measure between transcript data of the at least one message and a selected message; and selecting the content-based label as a tool of the one or more tools if the similarity measure exceeds a similarity threshold.

Clause 8: The method of any one of Clauses 1-7, wherein fine tuning the LM comprises setting an input limit and an output limit for a prompt of the LM based on a quantity of tokens, the input limit and the output limit being set to satisfy a latency threshold of the LM.

Clause 9: The method of Clause 8, wherein the quantity of tokens is at least one of a maximum quantity of tokens that meets a generation criterion or a set of tokens associated with one or more LM parameters.

Clause 10: The method of any one of Clauses 1-9, further comprising: deploying the fine-tuned LM in a system; and using the deployed fine-tuned LM to: determine the one or more tools while the second conversation is ongoing perform the one or more actions using the one or more tools.

Clause 11: The method of Clause 10, wherein the one or more actions are performed within an interval of time measured from a start time of a corresponding message of the second conversation.

Clause 12: A method, comprising: receiving a conversation stream of a conversation, wherein the conversation stream includes one or more messages and one or more events; determining, using a fine-tuned LM, one or more tools that are external to the fine-tuned LM and invokable, by the fine-tuned LM, at least to generate an output that is related to an event and at least one message that is mapped by the fine-tuned LM to the event, the output being usable by the fine-tuned LM during the conversation to cause one or more actions to be performed, the fine-tuned LM being pretrained using at least one of event-based labeling or content-based labeling; and causing one or more actions to be performed based on the output generated by the one or more tools.

Clause 13: The method of Clause 12, wherein the one or more tools are determined based on an event type.

Clause 14: The method of any one of Clauses 12-13, wherein the fine-tuned LM is configured with a prompt having an input limit and an output limit LM that is based on a quantity of tokens, the input limit and the output limit being set to satisfy a latency threshold of the LM.

Clause 15: The method of Clause 14, wherein the quantity of tokens is at least one of a maximum number of tokens that meets a generation criterion or a set of tokens of one or more LM parameters.

Clause 16: The method of any one of Clauses 12-15, wherein the one or more actions are performed within an interval of time measured from a start time of a corresponding message of the conversation.

Clause 17: The method of any one of Clauses 12-16, further comprising: invoking, in response to the determination of the one or more tools, one or more functions corresponding to the one or more tools based on at least one parameter.

Clause 18: The method of any one of Clauses 12-17, wherein the one or more actions include at least one of: causing the fine-tuned LM to generate text based on the output; causing an API to provide data associated with the one or more tools; or causing another artificial intelligence model to perform another action associated with the one or more tools.

Clause 19: A processing system, comprising: memory comprising computer-executable instructions; and one or more processors configured to execute the computer-executable instructions and cause the processing system to perform a method in accordance with any one of Clauses 1-18.

Clause 20: A processing system, comprising means for performing a method in accordance with any one of Clauses 1-18.

Clause 21: A non-transitory computer-readable medium storing program code for causing a processing system to perform the steps of any one of Clauses 1-18.

Clause 22: A computer program product embodied on a computer-readable storage medium comprising code for performing a method in accordance with any one of Clauses 1-18.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:

obtaining a first conversation stream of a first conversation, wherein the first conversation stream includes one or more messages and one or more events;

mapping an event of the one or more events to at least one message of the one or more messages, wherein the mapping is performed using event-based labeling and comprises:

determining a first message of the at least one message that is closest in time to the event and precedes the event;

determining one or more additional messages of the at least one message that precede the first message, wherein a time delta between an earliest message of the one or more additional messages and the first message is within a threshold; and determining an event type corresponding to the event; and fine-tuning a language model (LM) according to the mapping of the event to the at least one message at least by using the event type as a label that is input to the LM and the at least one message as input data to the LM, the fine-tuning of the LM comprising adjusting one or more LM parameters such that the fine-tuned LM is configured for:

determining one or more tools that are external to the fine-tuned LM and invokable, by the fine-tuned LM, at least to generate an output that is related to the event type, the event, and the at least one message, the output being usable by the fine-tuned LM during a second conversation to perform one or more actions.

2. The method of claim 1, wherein the event type is a ground truth label for determining the one or more tools.

3. The method of claim 1, wherein:

the first message and the one or more additional messages comprise transcript data, and the mapping further comprises joining the transcript data with the event.

4. The method of claim 1, wherein the event is another label usable to fine-tune the LM.

5. The method of claim 1, wherein:

the mapping is performed further using content-based labeling, and the mapping comprises:

determining a content-based label based on a similarity measure between transcript data of the at least one message and a selected message; and selecting the content-based label as a tool of the one or more tools if the similarity measure exceeds a similarity threshold.

6. The method of claim 1, wherein fine-tuning the LM comprises setting an input limit and an output limit for a prompt of the LM based on a quantity of tokens, the input limit and the output limit being set to satisfy a latency threshold of the LM.

7. The method of claim 6, wherein the quantity of tokens is at least one of a maximum quantity of tokens that meets a generation criterion or a set of tokens associated with the one or more LM parameters.

8. The method of claim 1, further comprising:

deploying the fine-tuned LM in a system; and using the deployed fine-tuned LM to:

determine the one or more tools while the second conversation is ongoing; and perform the one or more actions using the one or more tools.

9. The method of claim 8, wherein the one or more actions are performed within an interval of time measured from a start time of a corresponding message of the second conversation.

10. An apparatus comprising a processing system that includes one or more memories and one or more processors coupled to the one or more memories, the processing system configured to cause the apparatus to:

obtain a first conversation stream of a first conversation, wherein the first conversation stream includes one or more messages and one or more events;

map an event of the one or more events to at least one message of the one or more messages, wherein the mapping is performed using event-based labeling and the processing system that is configured to cause the apparatus to map the event of the one or more events to the at least one message of the one or more messages is further configured to:

determine a first message of the at least one message that is closest in time to the event and precedes the event;

determine one or more additional messages of the at least one message that precede the first message, wherein a time delta between an earliest message of the one or more additional messages and the first message is within a threshold; and determine an event type corresponding to the event; and fine-tune a language model (LM) according to the mapping of the event to the at least one message at least by using the event type as a label that is input to the LM and the at least one message as input data to the LM, wherein the processing system that is configured to cause the apparatus to fine-tune the LM is further configured to adjust one or more LM parameters such that the fine-tuned LM is configured to:

determine one or more tools that are external to the fine-tuned LM and invokable, by the fine-tuned LM, at least to generate an output that is related to the event type, the event, and the at least one message, the output being usable by the fine-tuned LM during a second conversation to perform one or more actions.

11. The apparatus of claim 10, wherein the event type is a ground truth label for determining the one or more tools.

12. The apparatus of claim 10, wherein the event is another label usable to fine-tune the LM.

13. The apparatus of claim 10, wherein the processing system that is configured to cause the apparatus to fine-tune the LM is further configured to set an input limit and an output limit for a prompt of the LM based on a quantity of tokens.

* * * * *